United States Patent [19]

Ballnus

[11] Patent Number: 5,626,754

[45] Date of Patent: May 6, 1997

[54] APPARATUS AND PROCESS FOR BIOLOGICAL WASTEWATER TREATMENT WITH CONTROLLED ADDITION OF CARBONACEOUS ORGANIC SUBSTRATES IN THE ANOXIC PHASE

[75] Inventor: Wilhelm Ballnus, Finkenschlag, Germany

[73] Assignee: Schreiber Corporation, Trussville, Ala.

[21] Appl. No.: 500,398

[22] Filed: Jul. 10, 1995

[30] Foreign Application Priority Data

Jul. 8, 1994 [DE] Germany .............................. 44 24 298.0

[51] Int. Cl.$^6$ .................................................. C02F 3/30
[52] U.S. Cl. ..................... 210/605; 210/610; 210/614; 210/630; 210/903; 210/906
[58] Field of Search .............................. 210/605, 610, 210/614, 620, 626, 630, 631, 745, 903, 906

[56] References Cited

U.S. PATENT DOCUMENTS

| | | |
|---|---|---|
| 4,333,838 | 6/1982 | Ballnus . |
| 4,548,715 | 10/1985 | Stein ............................... 210/614 |
| 4,693,827 | 9/1987 | Mordorski ......................... 210/614 |
| 4,859,341 | 8/1989 | Schreiber . |
| 5,013,442 | 5/1991 | Davis et al. ...................... 210/614 |
| 5,076,928 | 12/1991 | Ballnus . |
| 5,242,592 | 9/1993 | Ballnus . |
| 5,342,522 | 8/1994 | Marsman et al. ................ 210/605 |
| 5,482,630 | 1/1996 | Lee et al. ........................ 210/605 |

FOREIGN PATENT DOCUMENTS

| | | | |
|---|---|---|---|
| 2306704 | 8/1974 | Germany | 210/614 |
| 2532199 | 1/1977 | Germany | 210/614 |
| 3157184 | 7/1991 | Japan | 210/614 |

*Primary Examiner*—Neil McCarthy
*Assistant Examiner*—Theodore M. Green
*Attorney, Agent, or Firm*—Bell, Seltzer, Park & Gibson, P.A.

[57] ABSTRACT

An activated sludge treatment process and apparatus are provided for denitrification of a trickling filter plant effluent in which the nitrate nitrogen to BOD5 ratio can be maintained at less than or equal to 0.18 without the use of a nitrate monitor to control supplemental dosing with carbonaceous organic compounds or their salts. The apparatus is equipped with a turbidity meter, a phosphate monitor, and with a substrate storage tank for the addition of carbonaceous organic substrate. The substrate is added immediately at the end of the oxic phase and is continued until phosphate release is detected. Accordingly, the phosphate monitor functions as an indicator of nitrate respiration in the anoxic phase.

4 Claims, 2 Drawing Sheets

APPARATUS AND PROCESS FOR BIOLOGICAL WASTEWATER TREATMENT WITH CONTROLLED ADDITION OF CARBONACEOUS ORGANIC SUBSTRATES IN THE ANOXIC PHASE

FIELD OF THE INVENTION

This invention relates to the activated sludge process for biological wastewater treatment. More particularly, this invention relates to adjunctive treatments for removal of nitrogen from BOD deficient influent wastewaters.

BACKGROUND OF THE INVENTION

The activated sludge process is a biological process for the treatment of wastewater. Advanced processes comprise a sequence of oxic, anoxic, and anaerobic process phases in mixed liquor suspended solids that correspond to metabolic processes of living organisms. The process phases can be controlled by controlling the oxygen available in the wastewater.

Aeration is provided to the wastewater during the oxic phase, in which dissolved oxygen is present in the wastewater. Carbonaceous compounds are oxidized. Ammonium is oxidized to nitrates and nitrides. The organisms take up phosphates from the wastewater for storage in an energy rich form as polyphosphates.

The anoxic phase is characterized by the absence of dissolved oxygen. Aeration is turned off. The organisms use chemically bound oxygen in the form of nitrates and nitrides for respiration. Nitrates and nitrides are converted to nitrogen and carbonaceous compounds are oxidized.

In the anaerobic phase, aeration remains off and no dissolved oxygen is present. The organisms have used the available chemically bound oxygen in the anoxic phase. Accordingly, in the anaerobic phase, the organisms metabolize the previously stored energy rich form of phosphate and release phosphate back into the wastewater as orthophosphate.

U.S. Pat. Nos. 4,333,838; 4,859,341; 5,076,928; and 5,242,592 describe various apparatus and processes for treating wastewater with activated sludge. U.S. Pat. No. 5,076,928 describes a process for biological wastewater treatment in which the oxic, anoxic, and anaerobic reactions occur sequentially over the entire volume of a single reactor. The turbidity of the wastewater is monitored to provide a virtually instantaneous indication of the progress of the reaction through the separate phases and for control of aeration. Blowers are activated at maximum turbidity to initiate the oxic phase and are deactivated at minimum turbidity to initiate the anoxic and subsequent anaerobic phase. Up to 75% of phosphates can be removed by the process described in U.S. Pat. No. 5,076,928. Greater phosphate removal requires the addition of chemical flocculents either to the effluent or directly to the activated sludge tank. For smaller plants, a constant quantity of coagulant is maintained in the wastewater of the plant for elimination of the calculated, globally remaining phosphate content. For larger plants, a controlled coagulant dosage is preferred.

U.S. Pat. No. 5,242,592 describes another improvement in the activated sludge process in which the oxic phase is initiated independent of turbidity if the phosphate concentration exceeds a maximum set point in the anaerobic phase before the turbidity has reached a maximum. Acetic acid is added to increase phosphate elimination at the end of the anaerobic phase, prior to switching on the supply of oxygen.

The efficiency with which nitrogen is eliminated in the activated sludge process is dependent upon the ratio between nitrogen and the organic load, or biological oxygen demand, that is present in the wastewater. Biological oxygen demand, or BOD, can be determined after a five day period, and is designated "BOD5." The parameter BOD5 corresponds to the carbonaceous organic load in the wastewater that is fed to the activated sludge plant. The ratio of total incoming nitrogen to BOD5 should be less than or equal to 0.18 for efficient denitrification of wastewater. The ratio is determined based on the grams of incoming nitrogen and BOD per capita day. For example, a ratio of 11 g N/cap.d to 60 g BOD/cap.d=0.18 is commonly encountered.

However, values greater than 0.18 result in reduced denitrification efficiency because of the lack of organic load in the influent to the plant. Values greater than 0.25 result in instability in the wastewater treatment plant. If it is not possible to normalize the nitrogen to BOD5 ratio in the influent, then a BOD substitute is required.

Controlling the nitrate nitrogen to BOD5 ratio has become of increasing importance because activated sludge plants have been used to expand the treatment of trickling filter plants. Wastewater effluent from the trickling filter plant is presented to the activated sludge plant with a deficit in biological oxygen demand that is due to the reduced organic load of the trickling filter plant effluent. Trickling filter plants are capable of virtually complete nitrification of organic compounds. However, denitrification typically does not occur because of the usually low retention time of the wastewater in the trickling filter plant. Trickling filter plants typically have to be expanded today because of the ever increasingly stringent effluent requirements for denitrification of wastewater.

Expensive nitrate monitoring systems that require extensive and expert maintenance have been used to monitor the incoming nitrate load to activated sludge plants. When an excess of nitrate is measured, then a carbonaceous organic material or its salt is added to the influent to the activated sludge plant to make up for the deficit of organic material. The carbonaceous organic material is added to obtain the ratio of nitrate nitrogen to BOD5 of 0.18.

Commonly used carbonaceous organic materials include easily biodegradable substrates such as methanol, acetic acid, acetyls, or similar carbon carriers. The carbonaceous organic material typically is added directly to the activated sludge tank during the anoxic phase, whether the process is conducted in a single tank or in multiple tanks. The addition can take place either uncontrolled with empirically determined quantities or in a controlled manner by monitoring the nitrate levels using nitrate monitoring systems.

However, nitrate monitoring systems are expensive and require extensive and expert maintenance. It would be desirable to operate activated sludge plants for efficient denitrification of influents with a deficit of organic load without the use of such expensive and troublesome apparatus. Accordingly, it is an object of this invention to provide an activated sludge process that can efficiently denitrify wastewater influents that have a deficit of organic load without the use of expensive nitrate monitoring apparatus.

SUMMARY OF THE INVENTION

This invention is based on the recognition that a deficit of carbonaceous organic substrate in the influent to an activated sludge plant precludes complete elimination of nitrates in the anoxic phase. The invention provides an apparatus and method for adding a carbonaceous organic substrate immediately at the end of the oxic process phase and continuing the addition until the beginning of the phosphate release that signals the end of the anoxic phase and the beginning of the anaerobic phase. Complete denitrification is thereby indicated. The beginning of the release of phosphate can be established by means of a phosphate monitor, which is much more cost effective to operate than a nitrate monitoring system.

The apparatus for treating the activated sludge can be equipped with a turbidity meter, a phosphate monitor, and with a substrate storage tank operable with a pump for the addition of carbonaceous organic substrate. The dosing installation is controlled automatically in dependence on the monitored turbidity and the phosphate concentration in the wastewater. The phosphate monitor functions as an indicator of phosphate release in the anaerobic phase and as an indicator of nitrate respiration in the anoxic phase.

Thus, the invention provides an activated sludge treatment process and apparatus that can be operated without the complicated, costly, and high maintenance of a nitrate monitor. Investment costs and regular maintenance expenses can be reduced.

BRIEF DESCRIPTION OF THE DRAWINGS

The invention is further described with reference to the attached drawings in which.

DETAILED DESCRIPTION

Figure 1:
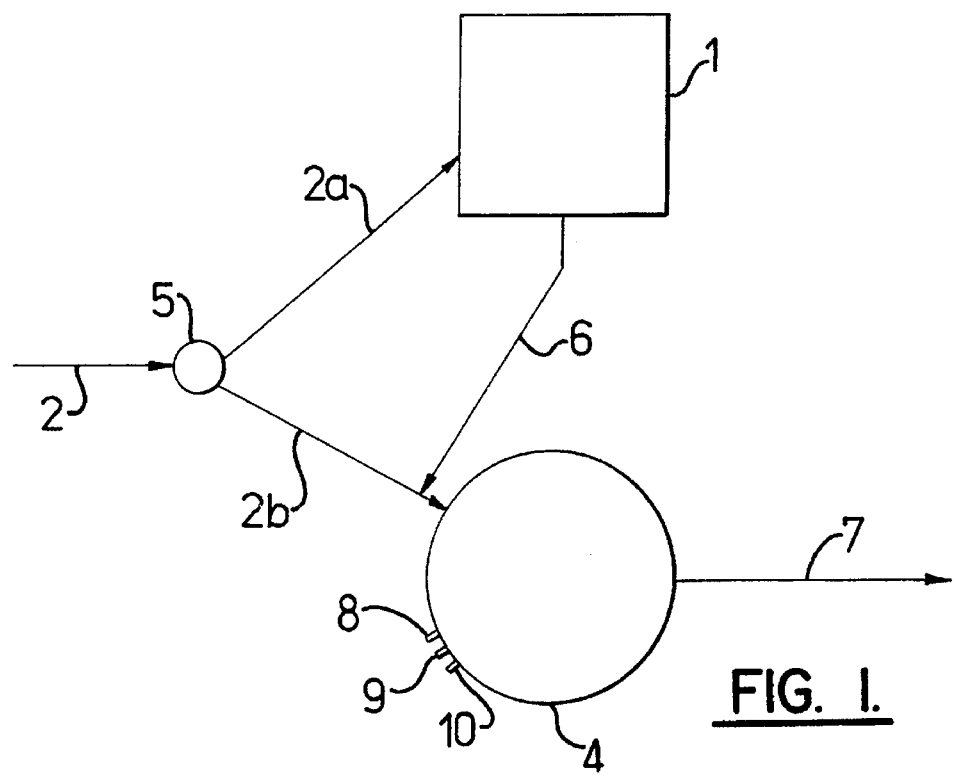
FIG. 1 represents in highly schematic form a process flow diagram for an activated sludge plant that receives the effluent from a trickling filter plant.

As shown in FIG. 1, influent line 2 provides wastewater to a splitter box 5 that creates proportional wastewater quantities flowing through branch lines 2a and 2b to a trickling filter plant 1 and to an activated sludge plant 4, respectively. The trickling filter effluent 6 is highly loaded with nitrate because the trickling filter plant typically does not accomplish denitrification. The trickling filter plant effluent, highly loaded with nitrate and with a deficit of organic material, is directed to the activated sludge plant 4 for nitrate respiration. As illustrated, the trickling filter effluent 6 joins branch line 2b, which provides the influent to the activated sludge plant 4.

Activated sludge plant 4 is equipped with a turbidity monitor 8 for control of the process phases in accordance with the methods and apparatus described in U.S. Pat. Nos. 4,333,838; 4,859,341; 5,076,298; and 5,242,592, the contents of which are incorporated herein by reference. A phosphate monitor 9 is added to the activated sludge plant 4 for control of biological phosphate removal, as described in U.S. Pat. No. 5,242,592. The phosphate monitor also controls biological nitrate respiration as is described below. Substrate storage tank 10 is connected to the activated sludge plant 4 and includes pumps and related equipment for dosing the wastewater at the appropriate time with a supplemental carbonaceous organic substrate or its salt. A treated wastewater substantially completely free of nitrate leaves the activated sludge plant 4 by effluent line 7.

Figure 2:
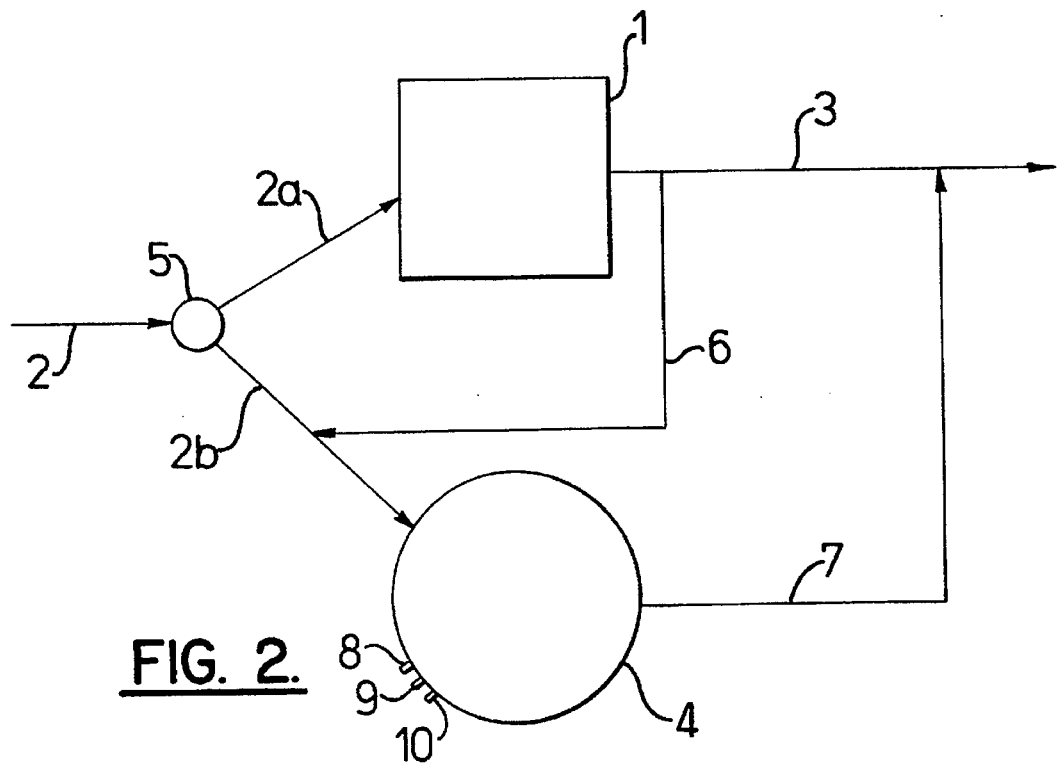
FIG. 2 represents an activated sludge plant that receives a portion of the effluent from a trickling filter plant.

The embodiment illustrated in FIG. 2 is similar to that shown in FIG. 1 and similar parts carry the same numbers. However, in FIG. 2, the branch line 2b for conveying a portion of the influent from splitter box 5 to the activated sludge tank 4 receives only a portion of the effluent 6 from the trickling filter plant. The effluent 7 from the activated sludge tank 4 is returned to the effluent 3 from the trickling filter plant so that the high nitrate concentration in the effluent from the trickling filter plant will be diluted. Consequently, the combined treated wastewater in effluent line 3 from the trickling filter plant and from the activated sludge plant is loaded with significantly less nitrate and can be conveyed to a receiving water.

Figure 3:
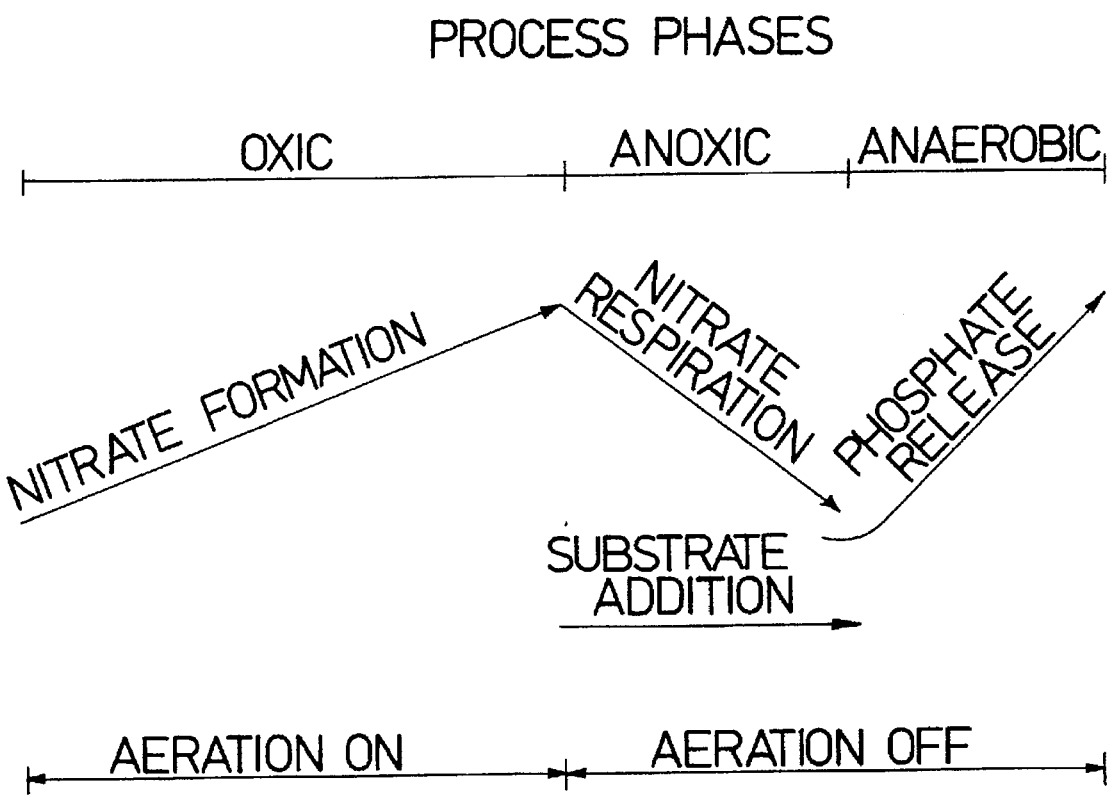
FIG. 3 represents the process phases of the activated sludge process and shows when substrate is added in accordance with the invention.

FIG. 3 illustrates biological nitrate respiration for nitrogen removal in the activated sludge tanks 4 of FIGS. 1 and 2. In the oxic phase, ammonium is oxidized to nitrate by aeration, which provides oxygen for respiration. Organic substances are oxidized. The bacteria absorb orthophosphate from the water and convert the orthophosphate to polyphosphate. In the anoxic phase, nitrate is reduced to nitrogen gas without aeration if the ratio of nitrate nitrogen to BOD5 is less than or equal to 0.18. If the ratio of nitrate nitrogen to BOD5 is higher than 0.18, then a carbonaceous organic substrate is added so that nitrate respiration will continue. The nitrate nitrogen to BOD5 ratio is usually occasionally determined in the laboratory, without need for a separate nitrate monitor at the plant. It should be noted that the nitrate nitrogen to BOD5 ratio is usually higher than 0.18 if the activated sludge plant is receiving influent from a trickling filter plant. However, the apparatus and process described herein should be applicable to influents received from any source that has a high nitrogen load or a deficit in organic load that results in an unfavorable nitrate nitrogen to BOD5 ratio.

In operation, the aeration is turned on when the turbidity has reached a maximum limiting value that has been set for the process to initiate the oxic phase of biological wastewater treatment. The oxic phase is continued until the turbidity reaches a minimum at which time the blowers are deactivated and the anoxic phase begins. Immediately at the beginning of the anoxic phase, supplemental carbonaceous organic substrates are added to the wastewater and this dosing is continued until the phosphate monitor indicates that phosphate is being released. Phosphate release signals the end of the anoxic phase and the beginning of the anaerobic phase of biological wastewater treatment. Phosphate release also signals the completion of nitrate respiration. The anaerobic phase is initiated and is continued in the absence of available oxygen until the maximum turbidity limit is again reached at which time the blowers are activated to initiate the oxic phase. The phosphate monitor can be used to monitor a limiting phosphate value, which, if exceeded prior to reaching the maximum turbidity limit, can be used to control activation of the blowers for more efficient phosphate elimination, as described in U.S. Pat. No. 5,242,592.

The above invention has been described with respect to particular preferred embodiments. However, the foregoing description is not intended to limit the invention to the illustrated embodiments, and the skilled artisan should recognize that variations can be made within the spirit and scope of the invention as described in the foregoing specification. The invention includes all alternatives, modifications, and equivalents that may be included within the spirit and scope of the invention as defined by the appended claims.

What is claimed is:

1. An activated sludge process for biological wastewater treatment wherein oxic, anoxic, and anaerobic process phases are controlled sequentially over the entire volume of a single tank reactor for the treatment of the wastewater, the process comprising:

a) supplying oxygen containing gas to the wastewater to initiate an oxic reaction;

b) stopping the supply of oxygen containing gas to the wastewater and initiating an anoxic reaction;

c) adding a carbonaceous organic substrate or its corresponding salt to the activated sludge tank for denitrification of nitrate at the end of the oxic process phase when the aeration is stopped;

d) continuing the addition of carbonaceous substrate or its corresponding salt during the anoxic phase;

e) detecting phosphate release in the wastewater; and f) stopping the addition of carbonaceous organic substrate or its corresponding salt when phosphate release is detected.

2. The process according the claim 1 further comprising the steps of monitoring the turbidity and monitoring the phosphate concentration of the wastewater and wherein oxygen is supplied to the wastewater in response to the monitored turbidity if the turbidity exceeds a predetermined maximum value, wherein the supply of oxygen is stopped if the turbidity has fallen below a predetermined minimum turbidity value, and wherein the supply of oxygen containing gas to the wastewater is initiated in dependence on a maximum predetermined phosphate concentration independently of the turbidity value.

3. An activated sludge process for biological wastewater treatment wherein oxic, anoxic, and anaerobic process phases are controlled sequentially over the entire volume of a single tank reactor for the treatment of the wastewater, the process comprising:

a) supplying oxygen containing gas to the wastewater to initiate an oxic reaction;

b) stopping the supply of oxygen containing gas to the wastewater and initiating an anoxic reaction;

c) adding a carbonaceous organic substrate or its corresponding salt to the activated sludge tank for denitrification of nitrate at the end of the oxic process phase when the aeration is stopped;

d) continuing the addition of carbonaceous substrate or its corresponding salt during the anoxic phase;

e) determining when the anoxic phase ends and the anaerobic phase begins; and f) stopping the addition of carbonaceous organic substrate or its corresponding salt when the anoxic phase ends.

4. The process according to claim 3 wherein the concentration of phosphates in the wastewater is monitored to determine when the anoxic phase ends.

* * * * *